S. RIGBY, 3d, & C. F. RIGBY.
Liquid Measure.
No. 200,091. Patented Feb. 5, 1878.
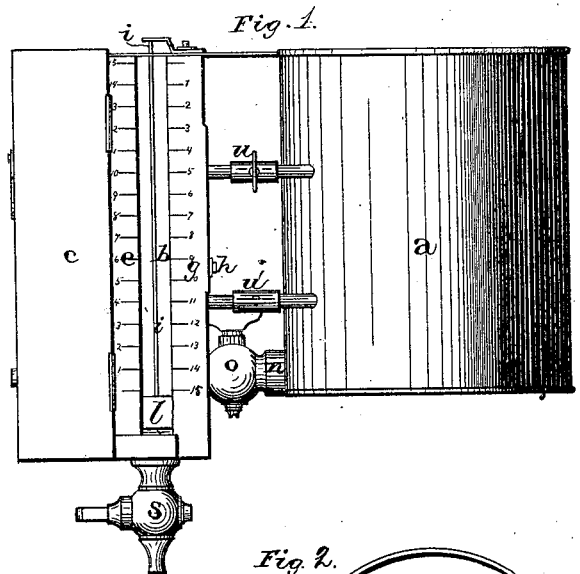
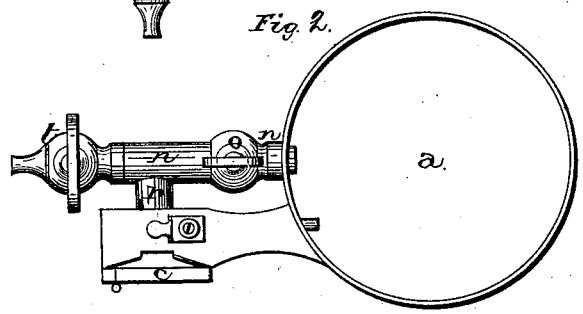
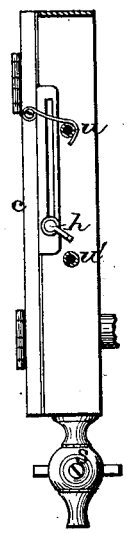
WITNESSES.
J. Wm. Garner
Will Kern
INVENTORS
C. F. Rigby
Seth Rigby 3d
per
F. A. Lehmann,
Atty

UNITED STATES PATENT OFFICE.

SETH RIGBY, 3D, AND CLARK F. RIGBY, OF NEWCASTLE, PENNSYLVANIA.

IMPROVEMENT IN LIQUID-MEASURES.

Specification forming part of Letters Patent No. 200,091, dated February 5, 1878; application filed August 28, 1877.

*To all whom it may concern:*

Be it known that we, SETH RIGBY, 3d, and CLARK F. RIGBY, of Newcastle, in the county of Lawrence and State of Pennsylvania, have invented certain new and useful Improvements in Devices for Measuring Crude Oils and Liquids of all Kinds; and we do hereby declare the following to be a full, clear, and exact description of the invention, such as will enable others skilled in the art to which it pertains to make and use it, reference being had to the accompanying drawings, which form part of this specification.

Our invention relates to an improvement in devices for measuring crude oils and liquids of all kinds; and it consists in the combination of a tank, measuring-tube, guide-rod, float, and pipes for connecting the tube and tank together, whereby the quantity of oil, by the help of scales, can be instantly seen, and the dividing-line between the oil and water shown, as will be more fully described hereinafter.

The accompanying drawings represent our invention.

$a$ represents an ordinary reservoir, of any suitable shape, kind, or construction. Connected to this reservoir is the measuring-tube $b$, which has a glass front, so as to allow the height of the liquid in the tank to be seen, and is provided with a door, $c$, so as to protect the glass from injury. Upon one side of this tube is permanently secured a scale, $e$, which indicates the number of pints, quarts, or gallons, and the figures run from the bottom up to the top. Upon the other side is attached a movable gage, $g$, which is slotted and provided with a set-screw, $h$, for holding it in any position into which it may be adjusted.

The permanent scale always indicates the quantity of oil or liquid that is in the reservoir, while the movable scale indicates the quantity that has been drawn off, or acts as a subtracter to show the number of gallons of each, when there are two kinds of liquid in the tank—as, for instance, crude oil and water. In this measuring-tube is placed the wire rod $i$, upon which the float $l$ moves. This float is so constructed that it will rise to the exact level of the water in the tank, and no farther. When there is both oil and water in the tank the two will mix slightly together, so that the exact water and oil line can never be distinguished in the tube.

In order to avoid this difficulty the float is constructed so that while it will rise to the top of the water, it will not float in the oil at all, and as a consequence the top edge of the float is raised just to the top of the water, and thus indicates very plainly where the dividing-line is. Through the top of the tube, where the upper end of this wire passes through, is made a suitable hole, so as to enable the air to pass freely in and out, and upon the top of the rod is placed a stop, so as to hold it always in position.

Leading from the bottom of the tank is a pipe, $n$, which is provided with a stop-cock, $o$, for shutting off the liquid from the tube whenever desired. From this pipe there is a smaller branch, $r$, which connects with the tube, so that when the stop-cock $o$ is opened the liquid rises in the tube to the same height that it is in the reservoir. Leading from the bottom of the tube is another stop-cock, $s$, through which the tube may be emptied whenever desired. In the end of the pipe $n$ is placed another stop-cock, $t$, through which the liquid from the tank may be drawn off whenever desired.

Passing from the side of the tank into the tube, at different elevations, are two or more pipes, $u$ $u'$, which are provided with stop-cocks, so that the liquid may be shut off from the tube whenever desired. One or more of these pipes, $u'$, are absolutely necessary to balance or equalize the gravity of the oil in the tube to the gravity of the oil in the tank. If these tubes are not provided, the oil in the tubes will not find the bottom line between the oil and the water.

We broadly disclaim the invention of a float which rises only to the level of the water, and thus shows the dividing-line between the oil and the water.

We also disclaim the invention of the tube $b$, which is connected to the tank by means of suitable connecting-tubes, so as to indicate the level of the oil in the tank.

Having thus described our invention, we claim—

1. The combination of the reservoir $a$, tube $b$, fixed guide-rod $i$, float $l$, sliding thereon, and pipes $n$ $u$ $u'$, substantially as shown.

2. In combination with the measuring-tube of a reservoir, the rigid scale having the quantity of oil contained in the reservoir marked on it from its bottom toward its top, and an adjustable gage having the figures marked from the top to the bottom, and which is provided with a set-screw, $h$, for holding it in any position, substantially as set forth.

In testimony that we claim the foregoing we have hereunto set our hands this 24th day of August, 1877.

SETH RIGBY, 3d.
    CLARK FREE RIGBY.

Witnesses:
 D. J. STEWART,
 WM. S. BINNING.